United States Patent

[11] 3,579,130

[72] Inventor Vern N. Smiley
San Diego, Calif.
[21] Appl. No. 842,917
[22] Filed July 18, 1969
[45] Patented May 18, 1971
[73] Assignee The United States of America as represented by the Secretary of the Navy

[54] THIN FILM ACTIVE INTERFERENCE FILTER
6 Claims, 2 Drawing Figs.
[52] U.S. Cl. ................................................... 330/4.3,
331/94.5, 350/166
[51] Int. Cl. ....................................................... H01s 3/05
[50] Field of Search ............................................. 350/166;
330/4.3; 331/94.5

[56] References Cited
UNITED STATES PATENTS
3,214,702 10/1965 Maurer ........................ 330/4.3
3,245,002 4/1966 Hall ............................. 331/94.5
3,297,958 1/1967 Weiner ........................ 331/94.5
3,333,206 7/1967 Bret et al. .................... 330/4.3
3,355,674 11/1967 Hardy .......................... 331/94.5
3,431,437 3/1969 Kosonocky ................... 307/312
3,484,713 12/1969 Fenner ......................... 331/94.5

OTHER REFERENCES
Johnson et al.: " Optically Pumped Thin-Platlet Semiconductor Lasers," Journal of Applied Physics, vol. 39, pp. 3977-3985, July, 1968.
Stillman et al.: " Volumn Excitation of an Ultrathin Single-Mode Cdse Laser," Applied Physics Letters, vol. 9, pp. 268-269, Oct., 1966.

Primary Examiner—Ronald L. Wibert
Assistant Examiner—Edward S. Bauer
Attorneys—Joseph C. Warfield, Jr., George J. Rubens and John W. McLaren ABSTRACT: A thin film of active laser material having a thickness of an integral number of one-half wavelengths of the laser emission energy is disposed between two multilayer films having high reflectance properties relative to the wavelength of energy emitted by the active laser material while offering relatively good transmittance to a source of energy directed to the active laser material to raise its energy level. The multilayer films are each comprised of a number of layers alternating in high and low index of refraction and having a thickness of the order of one-quarter wavelength of the emitted laser energy. The multilayer high reflectance films disposed on either side of the thin film of active laser material may be supported on an appropriate substrate and the assembly is positioned in the path of an input signal which it is desired to filter and amplify as well as in the path of a source of excitation energy to produce an output signal commensurate in frequency with a known or determinable component of the input signal and in amplified form.

Patented May 18, 1971

3,579,130

INVENTOR.
VERN N. SMILEY
BY
ATTORNEYS

THIN FILM ACTIVE INTERFERENCE FILTER

STATEMENT GOVERNMENT INTEREST

The invention described herein may be manufactured and used by or for the Government of the United States of America for governmental purposes without the payment of any royalties thereon or therefor.

CROSS REFERENCES TO RELATED APPLICATIONS

The subject matter of this invention is related generally to copending applications Ser. No. 842,938, titled Thin Film Laser, Ser. No. 842,914, titled Wide Range Continuously Tunable Thin Film Laser, Ser. No. 842,939, titled Narrow Band Tunable Laser Oscillator Amplifier, Ser. No. 842,915, titled Continuously Tunable Thin Film Laser Employing the Electric Field Effect, Ser. No. 842,916, titled Method of Producing a Thin Film Laser, all filed in the name of applicant under date of July 18, 1969.

BACKGROUND OF THE INVENTION

Conventional passive optical interference filters may consist of two sets of reflecting layers each consisting of multilayer dielectric material separated by a dielectric spacer layer. The transmitted spectrum of such a passive interference filter consists of sharp maxima at wavelengths where the effective optical thickness of the spacer layer is a multiple of one-half wavelength of the input incident radiant energy. The maximum possible transmittance is theoretically equal to unity so that such a passive interference filter is without gain. However, the actual transmittance is always less than unity due to losses in the materials. The bandwidth of the filter is determined by the effective optical thickness of the spacer layer and the reflectance of the multilayer films. The bandwidth decreases with increasing reflectance and increasing spacer thickness.

The achievement of laser action in ruby rods, in a mixture of $He$ and $Ne$ gases, and subsequently in many other materials has given experimental verification to certain prior theoretical predictions of the feasibility of coherent amplification at the visible, ultraviolet, and infrared frequencies. In order to produce laser oscillation it is necessary to employ a material capable of optical gain. It is also necessary that the material be positioned in a a suitable high $Q$ cavity which essentially will allow the radiation to make many passages through the active material until enough amplification results to cause the laser oscillation.

Accordingly, it might be said that the high $Q$ cavity provides a type of feedback mechanism. It follows then that in order to make a coherent optical feedback amplifier or regenerative amplifier the laser oscillator should be modified by reducing either the single-pass gain, or the feedback, or both. A fundamental problem of dimensional stability arises however, when it is attempted to make such an amplifier with a cavity having dimensions of several orders of magnitude larger than the resonant wavelength. This problem is not nearly so important in an oscillator as it is in an amplifier since oscillation will automatically occur at frequencies for which the cavity is resonant.

Prior art optical amplifiers employing suitable gases for the laser material or solid materials in conventional forms of rods, for example, have presented difficult problems for certain applications.

Reflector spacing is very critical because a very minute change in the spacing causes the gain of the device to fall to its minimum value. In terms of a gaseous device operating at a frequency of one micron with a spacing of one meter and using invar spacers, a temperature change of 0.25° C. is sufficient to change the feedback from positive to negative. In order to keep the drift within the half-power points for a typical prior art arrangement the temperature must be maintained within ±0.002° C. which is manifestly a very stringent temperature requirement.

Much the same critical conditions are encountered in employing solid laser materials in the form of rods, for example. Generally speaking, solid laser materials in rod form are shorter than gas laser cells but their thermal expansion coefficients are much larger than invar, for example. The temperature dependence of index of refraction in solid materials also effects the optical thickness of the material. Additionally optical inhomogenieties and nonuniform distribution of excited atoms will influence the operation of a solid laser amplifier.

One way of obtaining dimensional stability is to place the entire cavity of the conventional form of laser amplifier in a very well regulated temperature environment and to use materials with minimal thermal expansion coefficients such as invar or quartz, for example, as separators for the reflectors. Other expedients may be employed; however, the basic problems of conventional forms of laser amplifiers remain as critical factors in their successful application.

In the preferred embodiment of the present invention these problems are circumvented by using thin layers in which the reflectors and active material are in intimate contact.

SUMMARY OF THE INVENTION

A device of the present invention in its most fundamental form may comprise two groups of reflecting multilayers of films separated by an active laser material or amplifier layer in the form of a film of material capable of lasting action at a known or determinable wavelength. The multilayer film and the thin film of laser material may be supported upon a suitable substrate material and the entire combination is disposed in the path of an input signal having a component of a wavelength which it is desired to amplify and also in the path of a source of radiant energy capable of raising the thin layer of laser material to an energy level at the wavelength which it is desired to amplify.

The multilayer films present an aggregate high reflectance to the wavelength of energy which it is desired to amplify and permit an acceptable level of transmittance at the wavelength of the source of energy employed to raise the energy level of the active layer of laser material. The multilayer reflecting films may be composed of any number of layers and are generally one-quarter wavelength in optical thickness at the wavelength which it is desired to amplify. The multilayers alternate between high and low index of refraction material and the larger the number of layers in the group, generally, the higher its aggregate reflectance to the wavelength which it is desired to amplify. In operation the device of the present invention filters an input signal having a wavelength component which it is desired to amplify so that both that component and an independent source of radiant energy is incident upon a thin film of active laser material raising its energy level to provide an amplified output signal commensurate in amplitude with that wavelength component of the input signal which it is desired to amplify.

Accordingly, it is a primary object of the present invention to provide an extremely high resolution active interference filter.

Another most important object of the present invention is to provide an interference filter operative at a known or determinable wavelength which will produce amplification as well as filtering action relative to the known or determinable wavelength.

Yet another object of the present invention is to provide an interference filter operative in the visible, ultraviolet, and infrared wavelength regions.

A further most important object of the present invention is to provide such an active interference filter which is capable of significantly improved signal-to-noise ratio in its operation.

A further object of the present invention is to provide such an active interference filter which may be embodied in different forms to produce different filter and amplification characteristics as desired.

These and other objects, and advantages of the present invention will be more fully appreciated from an understanding of the following description of the operation of several embodiments as illustrated in the accompanying drawings and the scope of the invention is defined in the appended claims.

DESCRIPTION OF THE PREFERRED EMBODIMENT

Figure 1:
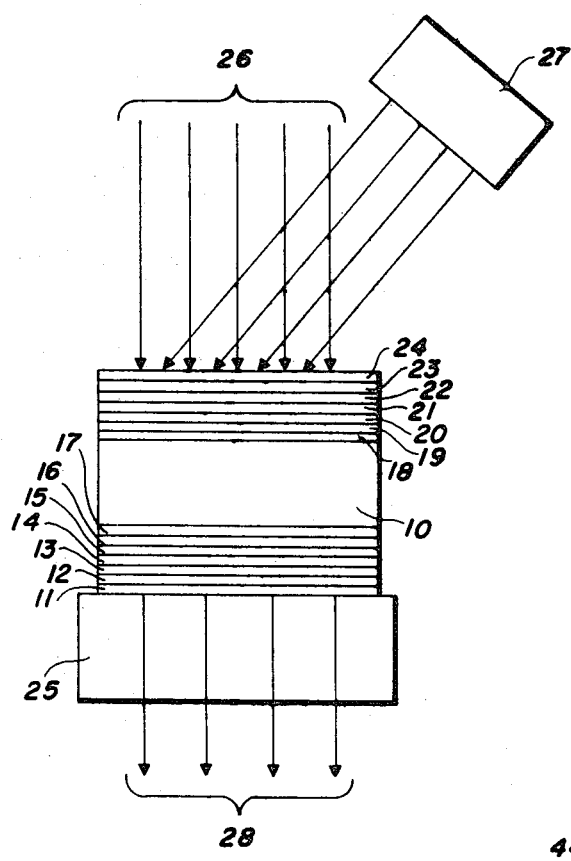
FIG. 1 is a partially cross-sectional illustration of a preferred embodiment of the present invention; and, FIG. 2 is an illustration of a variant embodiment of the present invention.

FIG. 1 illustrates a preferred embodiment of the present invention which comprises a thin film 10 of material capable of laser action. Disposed on either side of the thin film 10 of active laser material are multilayer groups of films which compose in the aggregate a high reflectance capability at the central operating wavelength. The layers 11, 12, 13, 14, 15, 16, and 17 are disposed beneath the thin film 10 of the active laser material and are each substantially one-quarter wavelength in optical thickness at the central operating wavelength of the device.

The multiple films comprising the layers 11, 12, 13, 14, 15, 16, and 17 are of alternate high and low index of refraction. A similar multilayer group of films is disposed above the thin film 10 of the active laser material. The upper multilayer of films 18, 19, 20, 21, 22, 23, and 24 are similarly each of quarter wavelength optical thickness relative to the central operating wavelength of the device and are also of alternate high and low index of refraction. Any suitable number of layers may be employed and, generally, the larger the number of layers, the higher is the aggregate reflectance quality of the multilayer aggregate. The quarter wavelength multilayer films may be of any suitable materials such as $ZnS$ for the high index material and $MgF$ for the low index material or any other appropriate dielectric materials.

The entire combination of the multiple layers of films disposed on either side of the active layer of laser material 10 may be supported upon an appropriate and suitable substrate base as indicated generally at 25.

The described combination of elements is disposed in the path of an input signal 26 of radiant energy so that the input signal is reflected many times by the multiple layer combination, passing through and being amplified by the active layer 10 of laser material. A source of radiant energy 27 is provided and produces a beam which may take an optical form, for example, and is directed so as to impinge upon and be absorbed by the active layer as illustrated and described. In its operation the device of the present invention as illustrated in FIG. 1 operates to produce an output beam of energy indicated generally at 28 which is effectively an amplification of the input signal 26 or of a known or determinable component of the input signal 26 which has a wavelength component common with the central operating frequency of the thin film 10 of active laser material. The transmittance of the active interference filter as illustrated in FIG. 1 exhibits maxima in the forms of output signals which are separated by $$\frac{C}{2nd}$$

in frequency in which $C$ is the speed of light in vacuum, $n$ is the index of refraction of the thin film of active laser material, and $d$ is the thickness of the active layer. The maximum transmittance may be expressed by $$T(\gamma_0) = \frac{T_2 T_1 G_0}{[1 - (R_2 R_1)^{1/2} G_0]^2} \quad (1)$$

where $T_2$ and $T_1$ are transmittances of the reflecting multilayers of films, $R_2$ and $R_1$ are the reflectances of the respective multilayer aggregations, $G_0$ is the active medium gain in a single passage of a wave of energy through the material at the frequency $\gamma_0$. The bandwidth of an active interference filter of the type contemplated by the present invention may be expressed as $$\delta\gamma = \frac{[1 - (R_2 R_1)^{1/2} G_0]c}{2\pi nd \, [(R_2 R_1)^{1/2} G_0]^{1/2}} \quad (2)$$

where $c$ is the speed of light in the active medium. These equations illustrate that the transmission can become very large and the bandwidth become very small as $(R_2 R_1)^{1/2} G_0$ approaches unity. At that point in its operation, the active interference filter will break into oscillation which, of course, is not desirable for the preferred operation.

Figure 2:
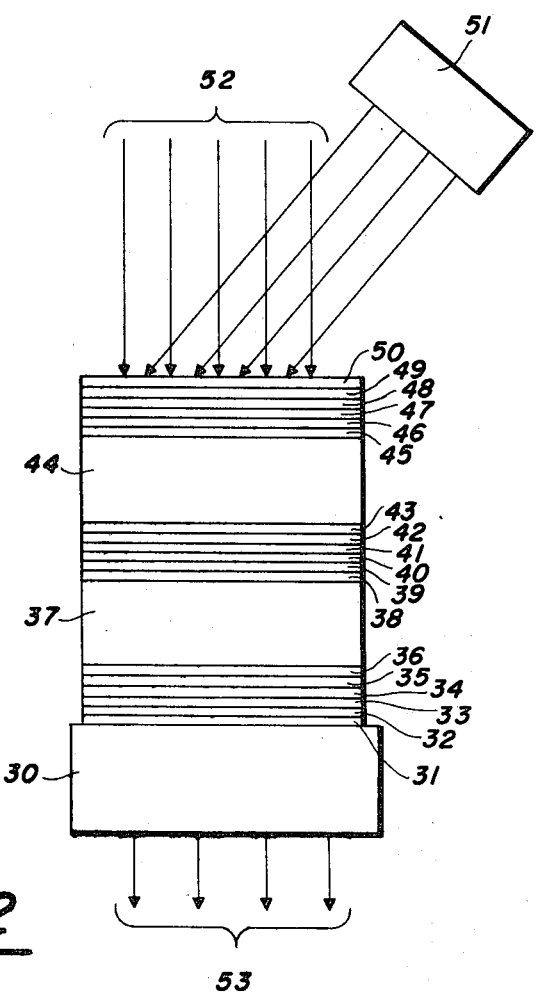

Alternatively, the active interference filter of the present invention may be composed of more than one thin film layer of active laser material as shown in a typical embodiment of FIG. 2. The substrate base 30 is shown in FIG. 2 supporting multilayer reflective films 31, 32, 33, 34, 35, and 36. These layers are comparable in their character and function to the multilayer reflective coatings described in connection with the illustration in the embodiment of FIG. 1. The multilayers 31, 32, 33, 34, 35, and 36 are of one-quarter wavelength optical thickness at the central operating frequency of the embodiment of FIG. 2 and are of alternate high and low index of refraction, which in the aggregate offer an extremely high reflectance at the central operating frequency while permitting a desirable degree of transmittance of energy from an external excitation source.

The multilayer coatings support a thin film of active laser material 37. This thin film is preferably of high gain material and is an integral number of half-wavelength thickness at the operating frequency of the assembly. The thin film of active laser material 37 has deposited thereon a second group of multilayer reflectance coatings 38, 39, 40, 41, 42, and 43 which are also a quarter wavelength thickness relative to the operating frequency of the assembly and the layers are alternatively high and low index of refraction to afford the high degree of aggregate reflectance which is desired. The second multilayer of reflective coatings 38, 39, 40, 41, 42, and 43 support a second active layer of laser material 44 which, in general, is of the same character as the first active lasting material 37. The thin film of active laser material 44 is desirably of high gain laser material and of a thickness substantially equal to an integral multiple of one-half wavelengths at the operation frequency of the assembly.

Supported immediately on the second thin film of active laser material 44 is a third group of multilayer reflective coatings 45, 46, 47, 48, 49, and 50 which are one-quarter wavelength in thickness at the operating frequency of the assembly and in the aggregate offer a very high reflectance to the energy emitted by the active layers 44 and 37. The multilayer coatings 45, 46, 47, 48, 49, and 50 are of alternate high and low index of refraction, as well, to provide the desirable operative characteristics of high reflectance at the operating frequency but an acceptable degree of transmittance for the energy impinging thereon from an external excitation source.

An external excitation source 51 is preferably positioned so that its emitted energy may be directed to the assembly while not interfering with an input signal shown generally at 52. The energy from the excitation source 51 reaches the active layers of laser material 37 and 44, raising the thin film of laser material to an energy level so as to in effect amplify the input signal in the form of the beam 52 providing an amplified output beam of energy as shown generally at 53 in FIG. 2.

The active layers of laser material 37 and 44 have gain over a specific band of wavelengths which include the operating frequency. The specific band of wavelengths at which the active thin film of laser material exhibits gain can be very broad for some semiconductor materials. For example, gain may be exhibited over a bandwidth of 100 A. in the visible region or a relatively narrow region for some dielectric crystalline materials of 1 A. or so.

The operating frequency is within the active bandwidth where each particular material demonstrates acceptable gain and may lie in the ultraviolet, visible, or infrared regions according to the material employed. Since the active layer of laser material in thin film form must, in accordance with the present invention, be an integral number of one-half wavelengths thick relative to the operating frequency, it is possible with different materials for the thickness of the active material to vary from less than 1 micron to several centimeters.

It should be appreciated that when more than one active layer of thin film of laser material is employed, as illustrated in the embodiment of FIG. 2, the active layers such as indicated at 37 and 44 may be of the same thickness or different thicknesses to produce different effects. Generally speaking, it will be found that the bandwidth is larger when two or more active thin films of material are employed than with a single active thin film of laser material. Moreover, when the gain is larger, separate peaks of amplitude output develop in the band-pass which is characteristic of the embodiment and a comb filter type of operation results which may be highly desirable for certain applications.

In both the embodiments in FIG. 1 and FIG. 2, the multilayer reflecting coatings may be replaced with appropriate metallic films in a single layer configuration. While such substitution provides an operable embodiment in accordance with the concept and teachings of the present invention, it is found to be less efficient in its performance than the preferred embodiments of FIGS. 1 and 2 as illustrated and described.

As will be appreciated by those skilled and knowledgeable in the art, the active interference filter of the present invention both amplifies an input signal and offers high resolution; that is, a narrow bandwidth operation compared with passive interference filters. These highly desirable characteristics of operation can provide a significantly improved signal-to-noise ratio in many detection systems. For example, the active interference filter of the present invention may find highly desirable use as a preamplification device for receivers in optical communications or navigational devices employing laser oscillators as sources of radiation. Additionally, active interference filters of the type conceived and taught by the present invention may prove to be especially useful in the very far infrared and submillimeter regions where extremely sensitive detectors are not generally available at present.

In the described preferred embodiments employed for purposes of illustration and explanation it should be appreciated that the illustrations of FIGS. 1 and 2 are not drawn to scale in the interests of simplicity and clarity in understanding their respective operation. Those skilled and knowledgeable in the art will appreciate that the extremely thin films and coatings referred to in the foregoing explanations may be of the order of relatively few wavelengths of the energy involved and that the proportions shown in the illustrated embodiments are not intended to be scalar representations.

Obviously many modifications and variations of the present invention are possible in the light of the above teachings. It is therefore to be understood that within the scope of the appended claims the invention may be practiced otherwise than as specifically described.

I claim:

1. A thin film active interference filter for amplifying radiant energy comprising:
   a radiant energy input signal having a component of a wavelength which it is desired to amplify;
   a source of radiant energy for optically pumping the active region of said active interference filter,
   said active region being a thin film of laser material capable of laser action at the wavelength it is desired to amplify, said laser material having a thickness substantially equal to an integral number of one-half wavelengths of the signal it is desired to amplify and being positioned to intercept the paths of said input signal and said source of radiant energy; and
   multiple reflecting layers disposed on each side of said thin film of laser material, said multiple reflecting layers having the property of transmitting the radiant energy from said source to said laser material to create a population inversion therein and having a maximum degree of reflectance for said wavelength component which is consistent with preventing oscillations which would distort said input signal.

2. A thin film active interference filter as claimed in claim 1 and including multiple thin films of laser material disposed between reflecting layers.

3. A thin film active interference filter as claimed in claim 1 wherein said layers are
   of alternate high and low indices of refraction and each having a thickness of substantially one-quarter wavelength of the wavelength it is desired to amplify.

4. A thin film active interference filter as claimed in claim 3 wherein sad multiple reflecting layers are of dielectric materials.

5. A thin film active interference filter as claimed in claim 3 wherein said layers of alternate high and low index of refraction material are ZnS and MgF, respectively.

6. A thin film active interference filter as claimed in claim 3 and including multiple thin films of laser material disposed between multiple reflecting layers having alternate high and low indices of refraction and each having a thickness of substantially one-quarter wavelength of the wavelength it is desired to amplify.